United States Patent Office 3,396,206
Patented Aug. 6, 1968

3,396,206
HIGH TEMPERATURE METHOD FOR PRODUCING STYRENE AND ETHYLBENZENE
Eric J. Y. Scott, Princeton, N.J., assignor to Mobil Oil Corporation, a corporation of New York
No Drawing. Filed Sept. 30, 1966, Ser. No. 583,449
4 Claims. (Cl. 260—669)

ABSTRACT OF THE DISCLOSURE

Styrene and ethylbenzene are prepared by pyrolyzing a mixture of toluene and an alkane having 1, 3 or 4 carbon atoms; reaction conditions include a mole ratio of alkane to toluene of at least 2:1, temperature in the range of 1000–1200° C., and exposure of reactants to the aforesaid temperature for a period of up to 3 milliseconds.

---

This invention relates to a high temperature method for producing styrene and, as a precursor thereof, ethylbenzene, by reaction of toluene with a low molecular weight alkane.

Currently, styrene is made commercially by a multistep process comprising reacting ethylene and benzene in the presence of aluminum chloride catalyst to form ethylbenzene, and then either catalytically dehydrogenating the ethylbenzene to styrene, or oxidizing it to acetophenone followed by reduction to the corresponding alcohol and dehydration of the latter to styrene. Over the foregoing processes the method described herein provides advantages in not requiring a catalyst, in being a one-step method, and in utilizing less expensive reactants.

More particularly, the invention comprises forming a mixture of toluene and an alkane having 1 to 4 carbons, except ethane, in which the mole ratio of alkane to toluene is at least 2:1, passing the mixture through a reaction zone heated to a temperature in the range of 1000 to 1200° C. and at a rate such that the reactants are exposed to said temperature for a period of up to 3 milliseconds, then rapidly cooling the reaction mixture, and thereby converting up to about 25% by weight of the toluene to products of which the major amount is styrene plus its said precursor.

The alkane reactant includes methane, propane, butane, and isobutane, with propane and isobutane being preferred. Besides the foregoing, liquified petroleum gas (LPG) may be useful particularly if olefins are first removed. As indicated, ethane is to be excluded, it having been found that with ethane yields of desired product are but a fraction of those obtainable with the other described alkanes.

Improved results in respect of yields are obtainable if the following reaction conditions are used: a temperature of 1000 to 1100° C. and a mole ratio of alkane to toluene of 2:1 to 6:1. Using these parameters, it is found that 10 to 25% by weight of the toluene is converted to products of which at least 60% by weight comprises toluene and its precursors.

Even better results in respect of yield are possible if the temperature is maintained in the vicinity of 1100° C. and the mole ratio of alkane to toluene is fairly high, ranging from 9:1 to 21:1. In this case the toluene conversion tends to be lower, ranging from 6 to 10% by weight, but of the products formed the proportion of styrene and its precursor is more than 70% by weight and, as indicated in Example 2, ranges up to 73% by weight of said products.

Of the two products of interest, namely, styrene and ethylbenzene, the amount of the latter predominates, although the amount of styrene is substantial, ranging from 10 to 20% of the total products. If desired, the ethylbenzene along with unreacted toluene may be recycled to the reaction zone to make more styrene; however, it is preferred to separate the ethylbenzene from the styrene, as by distillation, or other suitable means, and then to dehydrogenate it catalytically to form additional amounts of styrene. Such dehydrogenation may be carried out at temperatures of 600 to 700° C., using catalysts like zinc oxide, chromium oxide, iron oxide, or magnesium oxide, preferably supported on activated charcoal, alumina, bauxite, and the like.

The method in brief comprises metering the reactants from respective supply sources, mixing them, pumping the mixture preferably through a preheater where it is heated to a temperature of 200 to 300° C. and where a swirling action may be imparted, then reacting the mixture in a suitable reactor under the conditions noted, immediately quenching the reaction mixture as by introducing a cool inert quench gas such as helium, nitrogen, water vapor, and the like, and separating the desired product. Quenching is to preserve the styrene against further reaction, such as polymerization and decomposition, and results in an improved yield.

The reactor may be of any suitable design. To avoid the necessity for heating large masses of reactor material, it is desirably of tubular shape. Appropriate materials include steel and nickel-chromium alloys, and also quartz-lined reactors.

An inert carrier gas like nitrogen, helium, carbon dioxide, and the like may be added to the reactant mixture; its use decreases the partial pressure of the reactants, thus reducing the conversion at a given temperature and also the contact time, and thereby increasing the specificity of the reaction. Nitrogen is a preferred carrier. Such carriers also serve as an aid to evaluate any volume change during a reaction. It should be noted, however, that the alkane reactant, at the mole ratios employed, acts as a carrier gas.

Although the invention is not to be limited by theory, it is considered that methyl free radicals, $\dot{C}H_3$, are formed by decomposition of the alkane, and that benzyl free radicals, $C_6H_5\dot{C}H_2$, are formed from the toluene; these combine to give ethylbenzene, and the latter is dehydrogenated to styrene.

The invention may be illustrated by the following examples.

EXAMPLES 1–6

In a series of runs, identified below as Nos. 1 to 6, toluene was reacted with an alkane in a tubular reactor. For Nos. 1 and 3–6, the reactor comprised a thin-walled quartz liner inserted into a piece of 446 chromium steel tubing. A closely fitting cylinder of Inconel metal surrounded the tubing and provided a heat sink, being heated by an induction coil which was activated by a 6-kw. spark-gap converter. For No. 2, the reactor comprised a piece of Inconel tubing without liner. The reactor temperature was measured by a thermocouple positioned close to the reactor wall. The toluene and alkane were mixed, preheated to 200° C., swirl imparted, and then introduced to the reactor. The resulting mixture was analyzed by gas chromatography and by mass spectrometer analysis. Variations in the conditions of the runs, and the results obtained, are set forth in the following table. All runs were made at 1100° C.

| Run No. | Alkane | Mole Ratio, Alkane to Toluene | Residence Time, msec. | Conversion Based on Toluene, Percent | Wt. Percent Yield Based on Products | | Styrene and Precursor |
|---|---|---|---|---|---|---|---|
| | | | | | Ethylbenzene | Styrene | |
| 1 | Isobutane | 9:1 | 0.7 | 10 | 61 | 10 | 71 |
| 2 | Propane | 21:1 | 3.0 | 6.6 | 57.0 | 15.7 | 72.7 |
| 3 | do | 6:1 | 1.4 | 21 | 44 | 18 | 62 |
| 4 | n-Butane | 6:1 | 1.0 | 13 | 51 | 15 | 66 |
| 5 | Propane | 5:1 | 1.2 | 18 | 46 | 16 | 62 |
| 6 | do | 2:1 | 1.2 | 22 | 44 | 16 | 60 |

The conversions and yields are on a weight basis. Thus, in No. 1 the conversion figure of 10% means that 10% by weight of the total toluene charged was converted to various products, and the yield figures of 61% ethylbenzene and 10% styrene mean that 61% of these products was ethylbenzene and 10% was styrene. The sum of 61% and 10% give 71%, the figure in the last column, as the yield of styrene plus its precursor. In a run comparable to No. 6, except that the temperature was 1000° C., the yield of styrene plus precursor was 60%, as in No. 6, but the conversion was 8%, which though reduced, is still noteworthy. It may be noted that when the alkane is omitted from the reactant mixture, the yield of styrene plus precursor is less than ⅓ of the yields appearing in the table. With methane as the alkane, the yield of styrene plus precursor is of the order of 50%.

It may be seen that by limiting the conversion of the toluene, good selectivity is obtained for the styrene-precursor product. Desirably, and as indicated, the toluene conversion is in the range of 6 to 25% by weight, at which conversions the yield of said product is 60 to 73% by weight, based on the products formed. At higher conversions in this range, going from 10 to 25%, the yield is not less than 60%; and at lower conversions within the range, namely 6 to 10%, the yield is 70 to 73%. The products of interest, styrene and ethylbenzene, are of sufficient value to justify their production at the limited conversions described; styrene is an important monomer for the production of useful polymers by conventional methods, while ethylbenzene is useful, among other things, for making styrene.

It will be understood that the invention is capable of obvious variations without departing from its scope.

In the light of the foregoing description, the following is claimed.

1. Method for producing styrene and, as a precursor thereof, ethylbenzene which comprises forming a mixture of toluene and an alkane having 1 to 4 carbons, except ethane, the proportion of alkane to toluene being at least 2:1, molar basis, flowing the mixture rapidly through a reaction zone heated to a temperature in the range of 1000 to 1200° C. so that the reactants are exposed to said temperature for a time of about 0.5 to 3 milliseconds, rapidly cooling the reaction mixture, thereby converting up to about 25% by weight of said toluene to products of which the major proportion comprises said styrene and precursor.

2. Method of claim 1 wherein said alkane has 3 to 4 carbons, the proportion of alkane to toluene is in the range of 2:1 to 6:1, the temperature is 1000 to 1100° C., and wherein about 6 to 25% by weight of the toluene is converted to products of which 60 to 73% by weight comprise said styrene and precursor.

3. Method of claim 1 wherein said alkane has 3 to 4 carbons, the proportion of alkane to toluene is in the range of 2:1 to 6:1, the temperature is 1000 to 100° C., the time is 1 to 2 milliseconds, and wherein about 10 to 25% by weight of the toluene is converted to products of which at least 60% by weight comprise said styrene and precursor.

4. Method of claim 1 wherein said alkane has 3 to 4 carbons, the proportion of alkane to toluene is 9:1 to 21:1, the temperature is of the order of 1100° C., and wherein about 6 to 10% by weight of the toluene is converted to products of which at least 70% by weight comprise said styrene and precursor.

No references cited.

DELBERT E. GANTZ, *Primary Examiner.*

C. R. DAVIS, *Assistant Examiner.*

UNITED STATES PATENT OFFICE
CERTIFICATE OF CORRECTION

Patent No. 3,396,206                                August 6, 1968

Eric J. Y. Scott

It is certified that error appears in the above identified patent and that said Letters Patent are hereby corrected as shown below:

Column 4, line 23, "6:1" should read -- 21:1 --; line 29, "100° C." should read -- 1100° C. --.

Signed and sealed this 30th day of December 1969.

(SEAL)
Attest:

Edward M. Fletcher, Jr.                          WILLIAM E. SCHUYLER, JR.
Attesting Officer                                       Commissioner of Patents